(12) United States Patent
Hatton

(10) Patent No.: US 8,079,385 B2
(45) Date of Patent: Dec. 20, 2011

(54) VALVE ASSEMBLY

(75) Inventor: Jason D. Hatton, Essexville, MI (US)

(73) Assignee: Liquid Molding Systems, Inc., Midland, MI (US)

( * ) Notice: Subject to any disclaimer, the term of this patent is extended or adjusted under 35 U.S.C. 154(b) by 873 days.

(21) Appl. No.: 12/082,125

(22) Filed: Apr. 9, 2008

(65) Prior Publication Data
US 2009/0256101 A1 Oct. 15, 2009

(51) Int. Cl.
*F16K 15/14* (2006.01)
(52) U.S. Cl. .................................... 137/859; 137/512.15
(58) Field of Classification Search ............. 137/512.15, 137/859
See application file for complete search history.

(56) References Cited

U.S. PATENT DOCUMENTS

| | | | |
|---|---|---|---|
| 2,497,906 A * | 2/1950 | Peters et al. | 137/496 |
| 2,605,957 A * | 8/1952 | Houston | 137/859 |
| 2,646,063 A * | 7/1953 | Hayes | 137/218 |
| 3,221,952 A | 12/1965 | De See | |
| 3,321,114 A | 5/1967 | Croyle | |
| 3,804,113 A * | 4/1974 | Garcea | 137/496 |
| 4,570,826 A | 2/1986 | Fatorri | |
| 4,646,945 A | 3/1987 | Steiner et al. | |
| 4,874,369 A | 10/1989 | Kulle et al. | |
| 5,033,655 A | 7/1991 | Brown | |
| 5,115,950 A * | 5/1992 | Rohr | 222/490 |
| 5,213,236 A | 5/1993 | Brown et al. | |
| 5,242,423 A | 9/1993 | Goodsir et al. | |
| 5,271,571 A | 12/1993 | Maynard, Jr. | |
| 5,409,144 A | 4/1995 | Brown | |
| 5,531,363 A | 7/1996 | Gross et al. | |
| 5,788,215 A | 8/1998 | Ryan | |
| 6,062,435 A | 5/2000 | Hess, III | |
| 6,095,381 A | 8/2000 | Schwanenberg | |

(Continued)

FOREIGN PATENT DOCUMENTS

JP B2 45 38230 12/1970

OTHER PUBLICATIONS

U.S. Appl. No. 12/011,312, filed Jan. 25, 2008.

*Primary Examiner* — John Rivell
*Assistant Examiner* — Macade Brown
(74) *Attorney, Agent, or Firm* — Wood, Phillips, Katz, Clark & Mortimer

(57) ABSTRACT

The present invention is directed to a pressure-responsive valve assembly which functions in the nature of a check valve to control fluid flow across the assembly. The assembly includes a valve body which defines first and second internal flow passages, and includes a valve seat through which at least one flow port extends for joining the first and second passages in fluid communication with each other. A flexible, resiliently deformable valve member is positioned in operative association with the valve seat, and can be deflected, in response to a sufficient pressure differential, to move out of sealing engagement with the valve seat, to thereby permit fluid flow through the valve assembly. In the preferred embodiment, the valve seat of the valve assembly defines a compound sealing surface, including first and second sealing surfaces, which cooperate with the deflectable valve member to provide enhanced resistance to reverse fluid flow, with one preferred form of the present valve assembly further including a retention projection which cooperates with the valve member to further enhance resistance to reverse fluid flow.

17 Claims, 12 Drawing Sheets

U.S. PATENT DOCUMENTS

| | | |
|---|---|---|
| 6,158,458 A | 12/2000 | Ryan |
| 6,273,296 B1 | 8/2001 | Brown |
| 6,605,076 B1 | 8/2003 | Jepson et al. |
| 6,616,012 B2 | 9/2003 | Dark |
| 6,749,092 B2 | 6/2004 | Olechowski et al. |
| 6,951,295 B1 | 10/2005 | Gaus et al. |
| 7,077,296 B2 | 7/2006 | Brown et al. |
| 2008/0053568 A1 | 3/2008 | Johnson |

* cited by examiner

FIG. 13
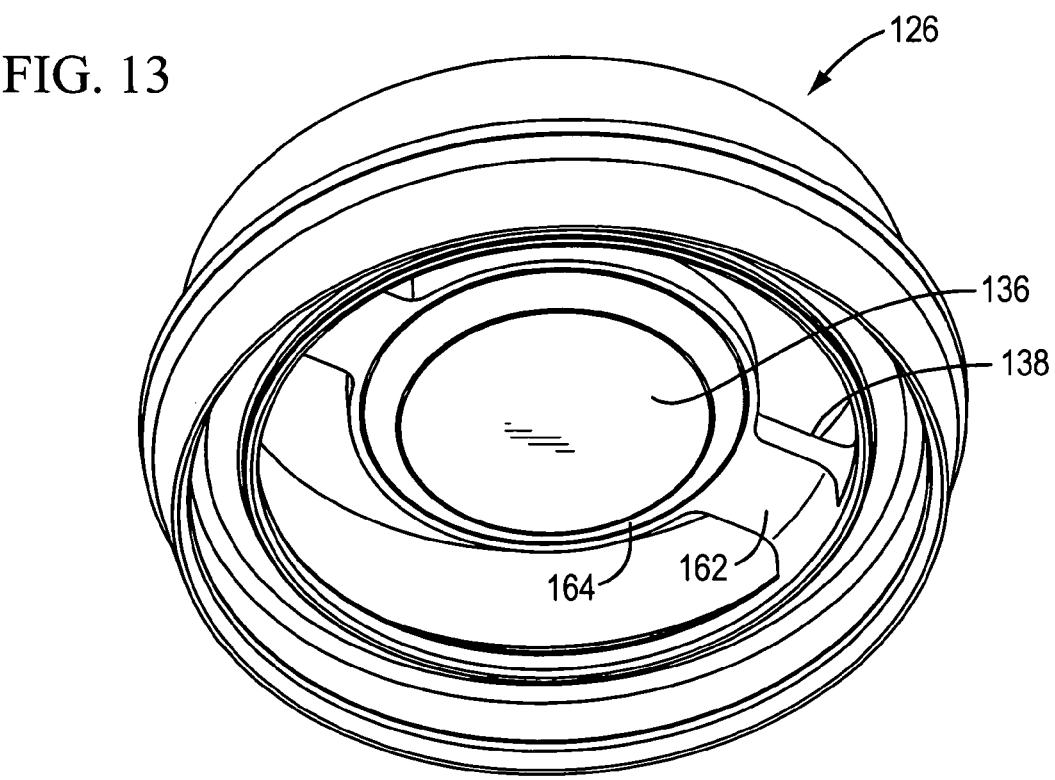
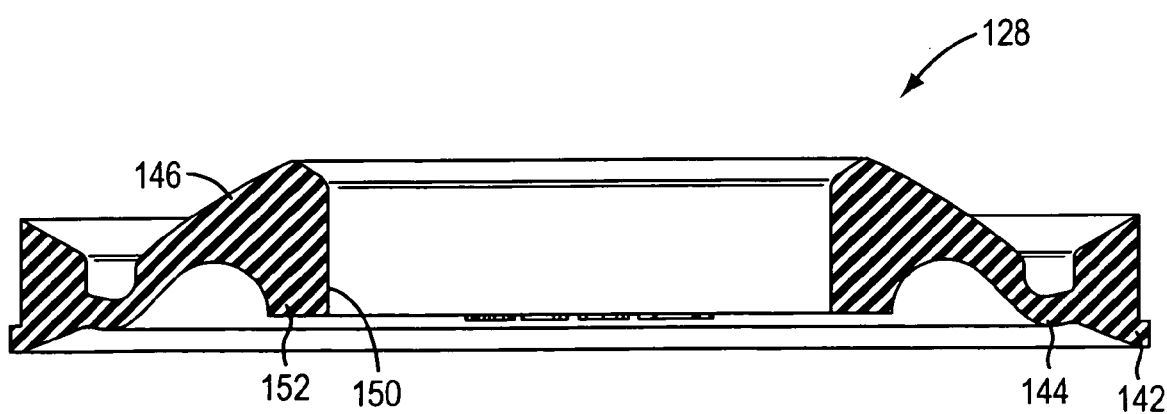
FIG. 14

VALVE ASSEMBLY

TECHNICAL FIELD

The present invention relates generally to a valve assembly configured for controlling fluid flow therethrough in response to a pressure differential which exists across the valve assembly, and more particularly to a check valve assembly including a pressure-responsive, elastomeric valve member which cooperates with an associated valve seat of the assembly for controlling fluid flow, wherein the assembly is configured to minimize reverse fluid flow through the assembly in response to a reverse pressure differential across the assembly.

BACKGROUND OF THE INVENTION AND TECHNICAL PROBLEMS POSED BY THE PRIOR ART

There are many applications in which an economical and reliable mechanism for pressure-responsive fluid flow control can be advantageously employed. Such applications can include an interface between two fluid conduits or the like, wherein pressure-responsive introduction of a fluid from one conduit to the other is desired, while reverse fluid flow is prevented. Similar flow control requirements may exist in connection with typical dispensing applications, such as dispensing of consumer products such as beverages, or other flowable products. Many industrial applications require pressure-responsive fluid flow control with a check valve arrangement, again with it typically being necessary for reverse fluid flow to be minimized or substantially prevented.

One type of valve assembly for controlling fluid flow which has proven to be particularly cost-effective includes a deflectable, elastomeric valve member which is mounted within, and generally cooperates with, an associated valve body, which arrangement can be readily configured for pressure-responsive fluid flow control. U.S. Pat. Nos. 5,033,655, No. 5,213,236, No. 5,271,571, and No. 6,749,092, all of which are hereby incorporated by reference, illustrate such valve assemblies with these patents, disclosing various applications in which such valve assemblies can be advantageously employed.

The present invention relates generally to a valve assembly of the above-described type, which assembly can be configured for pressure-responsive operation in the nature of a check valve. In one particularly preferred embodiment, the present valve assembly is configured to permit pressure-responsive fluid flow in response to a pressure differential across the valve assembly, with features of the present invention particularly configured to limit and control reverse fluid flow through the valve assembly in response to a reverse pressure differential across the valve assembly.

SUMMARY OF THE INVENTION

A valve assembly embodying the principles of the present invention is configured for controlling flow of a fluid within the valve assembly in response to a pressure differential which exists across the assembly. Notably, in one presently preferred illustrated embodiment, the present valve assembly is configured to permit pressure-responsive fluid flow, while desirably minimizing and limiting reverse fluid flow through the assembly in response to a reverse pressure differential. In another embodiment, the valve assembly is configured to facilitate dispensing of a fluid, such as a beverage, for convenient consumer consumption. In a further embodiment, the valve assembly is configured for fitment with associated tubing, containers, and like components.

In accordance with the illustrated embodiments, the present valve assembly includes a valve body defining first and second internal flow passages, with the body including an internal valve seat positioned between the first and second internal flow passages. The valve seat defines at least one flow port extending between the first and second flow passages for joining the flow passages in fluid communication with each other.

The present valve assembly further includes a flow-controlling valve member positioned within the valve body generally adjacent to the valve seat for controlling flow between the first and second flow passages through the flow port of the valve assembly. The valve member comprises resiliently deformable elastomeric material, which can be configured to provide pressure-responsive actuation of the valve assembly, with the valve member desirably configured to cooperate with the valve body to minimize reverse fluid flow to the valve assembly when a reverse pressure differential exists across the assembly.

In accordance with the illustrated embodiments, the valve member of the present valve assembly includes a peripheral attachment portion by which the valve member can be attached to the valve body, a flexible, resilient, intermediate portion extending from the peripheral attachment portion, and a central valve head, defining a central flow orifice, extending from the intermediate portion for sealing engagement with the valve seat of the valve body. At least part of the valve head is outwardly deflectable to an open configuration of the valve member when a sufficient pressure differential exists across the valve assembly to permit flow from the first internal flow passage, through the flow port, and the central flow orifice to the second internal flow passage.

Notably, the valve seat of the valve body defines a compound sealing surface for cooperative sealing engagement with the head of the valve member. The compound sealing surface includes a first sealing surface having a generally arcuate cross-sectional configuration, through which sealing surface the flow port extends. The compound sealing surface further includes a second, frusto-conical sealing surface, positioned inwardly of the first sealing surface. By virtue of the frusto-conical configuration, the second sealing surface has a generally linear cross-sectional configuration. The valve head of the valve member is sealingly engageable with the first and second sealing surfaces in a closed position of the valve member for preventing flow from the second internal flow passage, through the flow port, to the first internal flow passage of the valve assembly.

In a particularly preferred form, prevention of reverse fluid flow through the valve assembly is facilitated by providing one of the valve body and the valve member with at least one retention projection, positioned generally intermediate the first and second sealing surfaces of the valve seat, and engageable with the other of the valve body and valve member. In the illustrated embodiment, the valve body defines the retention projection positioned generally intermediate the first and second sealing surfaces of the valve seat. The retention projection is engageable with, and generally penetrates the valve head of the valve member when the valve head sealingly engages the valve seal.

In the preferred form, the retention projection of the valve body has an annular configuration, and is continuous.

In order to limit deflection of the valve head of the valve member attendant to pressure-responsive actuation of the valve assembly, in one illustrated embodiment, the valve body of the assembly preferably defines at least one stop member for limiting deflection of the valve head in the open configuration thereof. In one preferred embodiment, the valve body defines a plurality of the stop members spaced circumferentially about an axis defined by the second internal flow passage of the valve body.

As noted, the valve member of the present valve assembly includes a peripheral attachment portion by which the valve member can be attached to the valve body, which peripheral portion in the preferred form has a dovetail cross-sectional configuration. Retention of the valve member within the valve body is effected by the provision of a valve retention member having an annular valve retention portion, which member cooperates with a valve housing of the valve body to retain the valve member in position in captive relationship between the valve housing and the annular retention portion of the valve retention member.

In one presently preferred embodiment, the present valve assembly is configured as a so-called T-fitting, wherein the valve assembly controls pressure-responsive introduction of a fluid in the form of a liquid into another liquid stream. In this embodiment, the valve retention member defines a flow conduit which is joined in fluid communication with the second internal flow passage, via a conduit opening defined by the valve retention member. In this embodiment, the desired stop member for controlling deflection of the valve member is provided in the form of at least one stop member positioned on each side of the conduit opening for limiting deflection of the head of the valve member in the open configuration thereof. In the illustrated embodiment, the flow conduit defined by the valve member is disposed at a right angle to the first and second internal flow passages of the valve body, but it will be understood that the assembly can be configured so that the flow conduit is arranged at an acute angle to the first and second internal flow passages.

In another illustrated embodiment, the present valve assembly is configured for dispensing of a liquid, such as a beverage, with the valve body of the assembly including an internal thread formation at the first internal flow passage to facilitate convenient attachment to an associated container or the like.

In a further embodiment, the present valve assembly is shown in a configuration suited for cooperative fitment with associated components such as tubing members, containers, and the like.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same:

FIG. 13 is an isometric view of a component of the embodiment of the present valve assembly shown in FIGS. 11 and 12;

FIG. 14 is a cross-sectional view of a valve member of the valve assembly of the embodiment of the present valve assembly shown in FIGS. 11 and 12;

DESCRIPTION OF THE PREFERRED EMBODIMENTS

Figure 1:
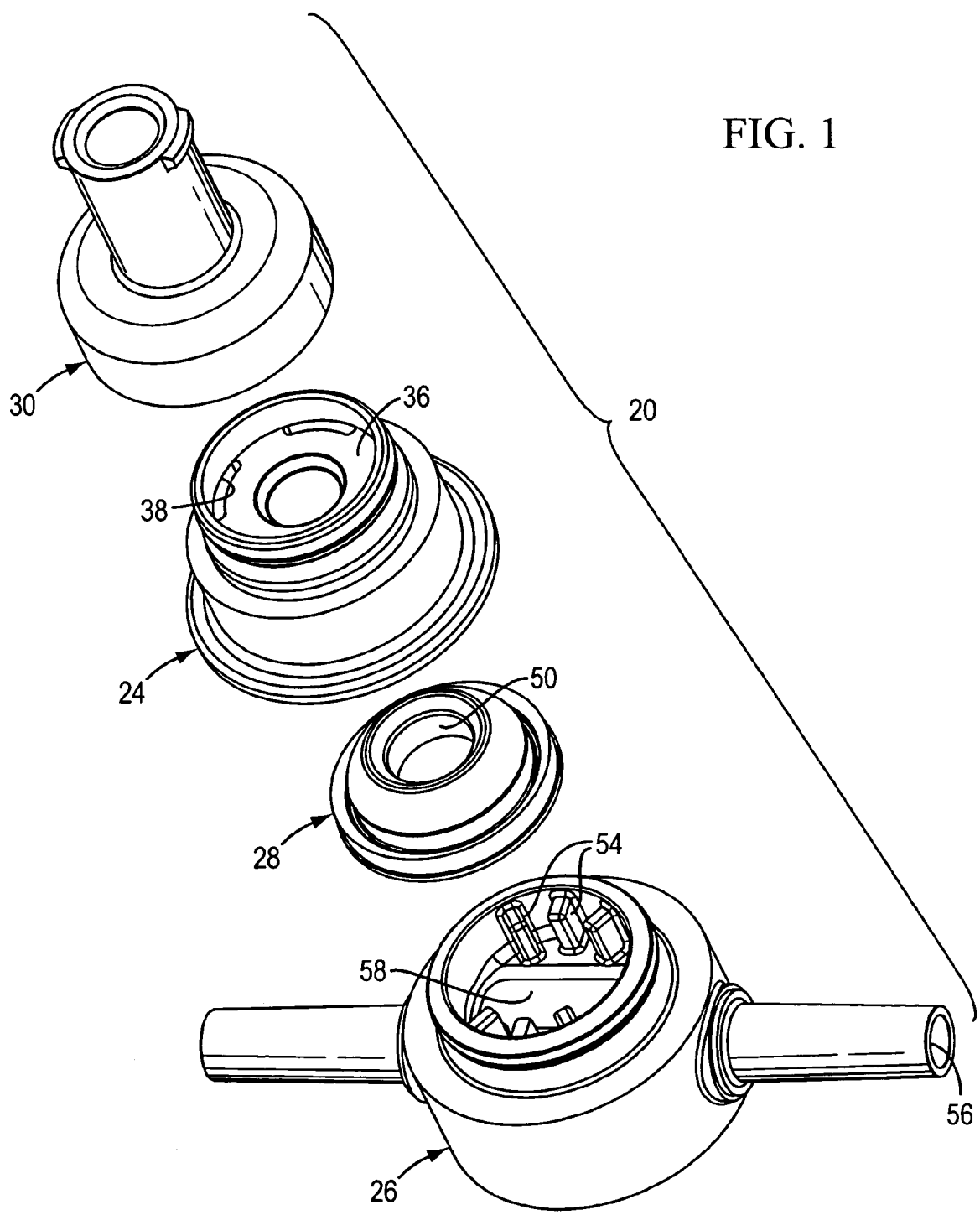
FIG. 1 is an exploded, isometric view of a valve assembly embodying the principles of the present invention, with this embodiment illustrated as a so-called T-fitting.
Figure 2:
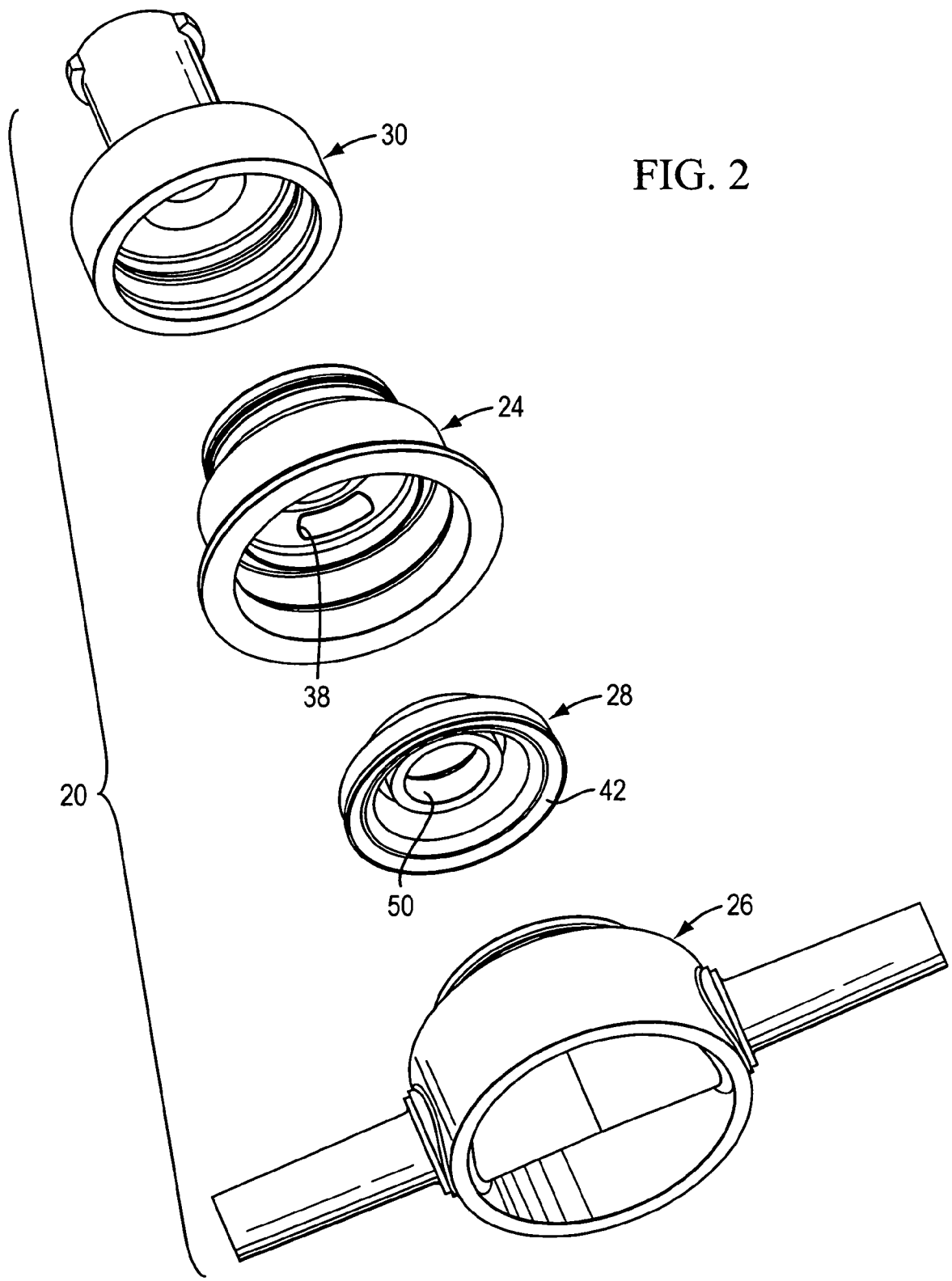
FIG. 2 is a further exploded isometric view of the valve assembly shown in FIG. 1.
Figure 3:
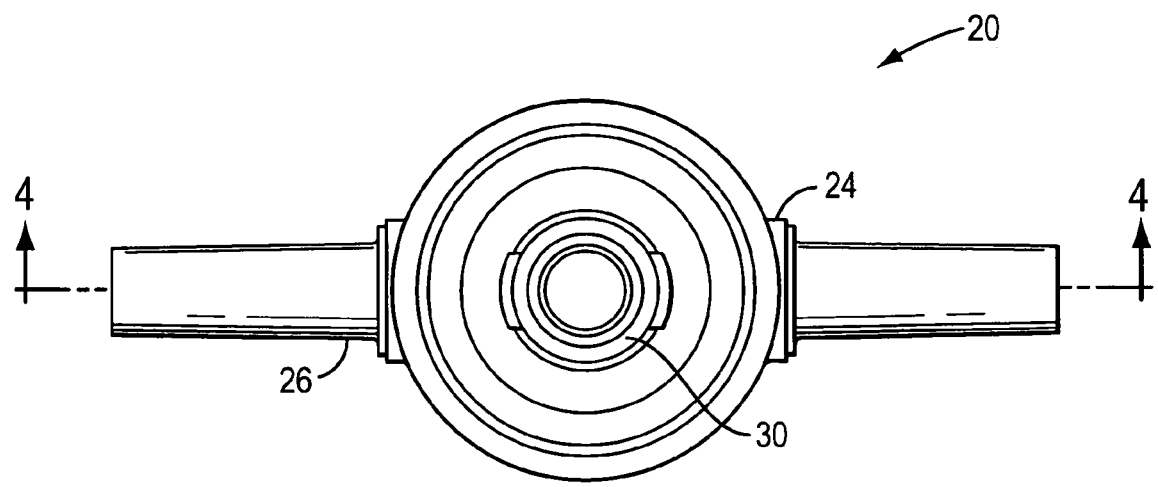
FIG. 3 is a top plan view of this embodiment of the present valve assembly.
Figure 4:
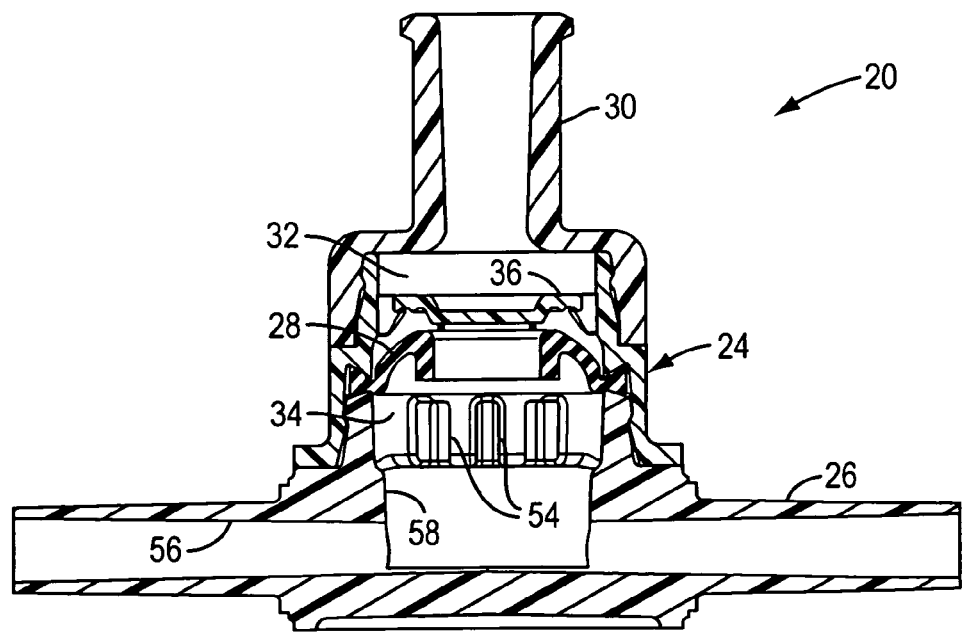
FIG. 4 is cross-sectional view taken generally along lines 4-4 of FIG. 3.
Figure 5:
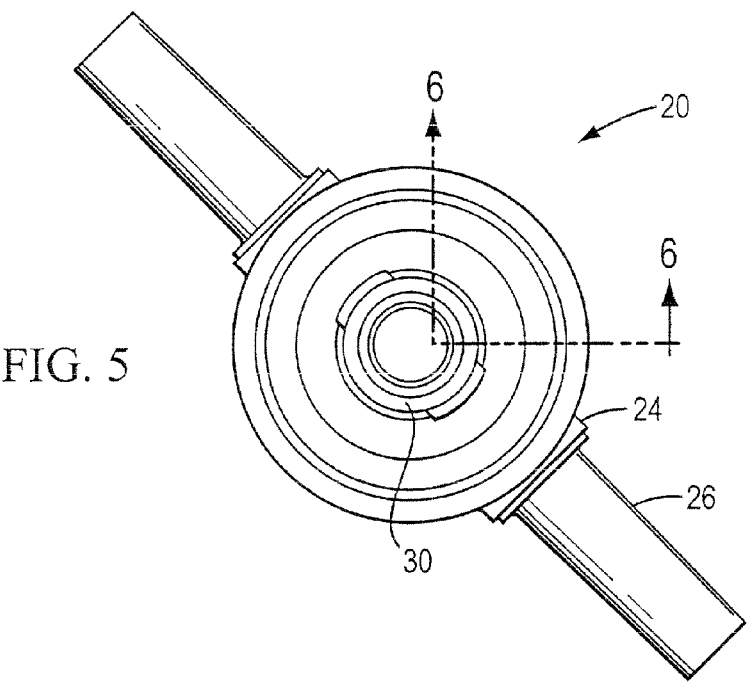
FIG. 5 is a further top plan view of the valve assembly of this embodiment.
Figure 6:
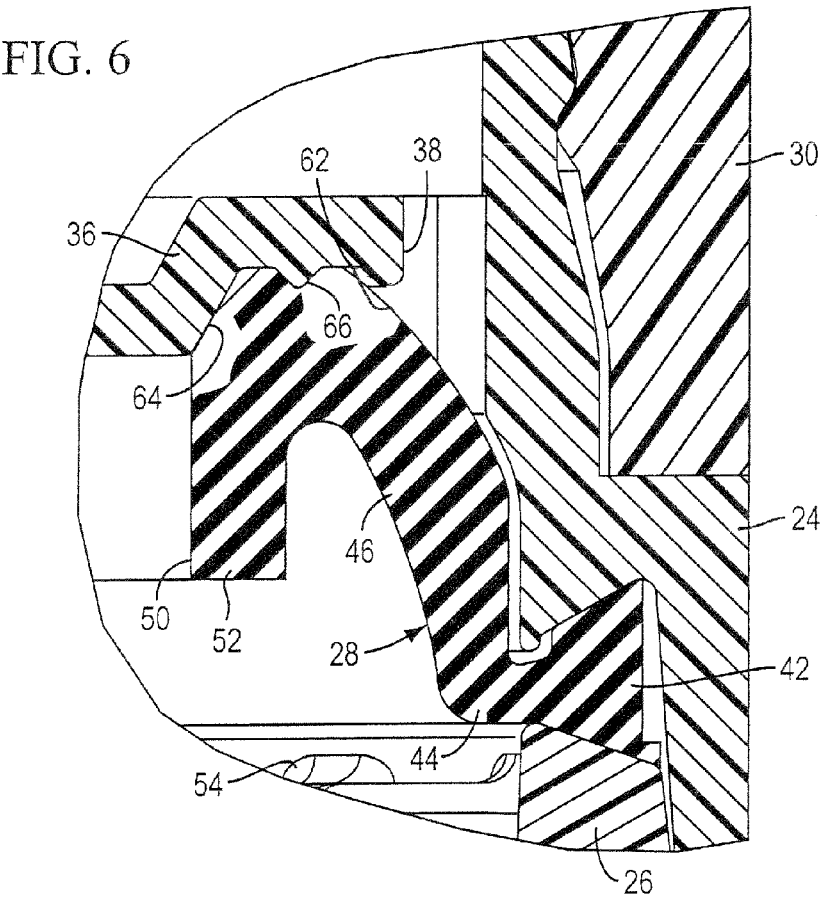
FIG. 6 is a relatively enlarged, fragmentary cross-sectional view taken along lines 6-6 of FIG. 5.
Figure 7:
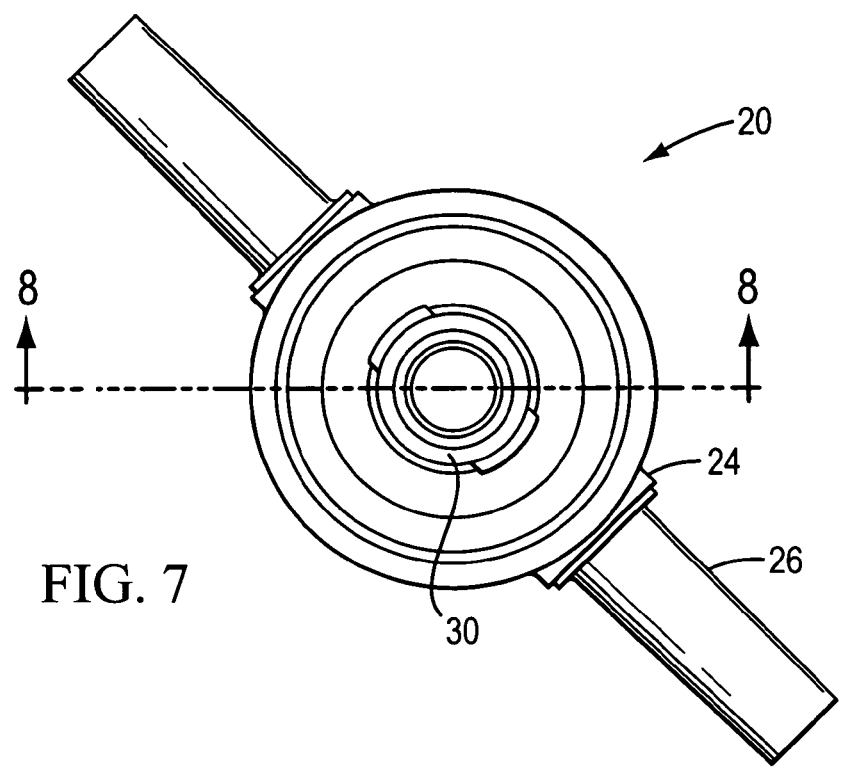
FIG. 7 is a further top plan view of this embodiment of the present valve assembly.
Figure 8:
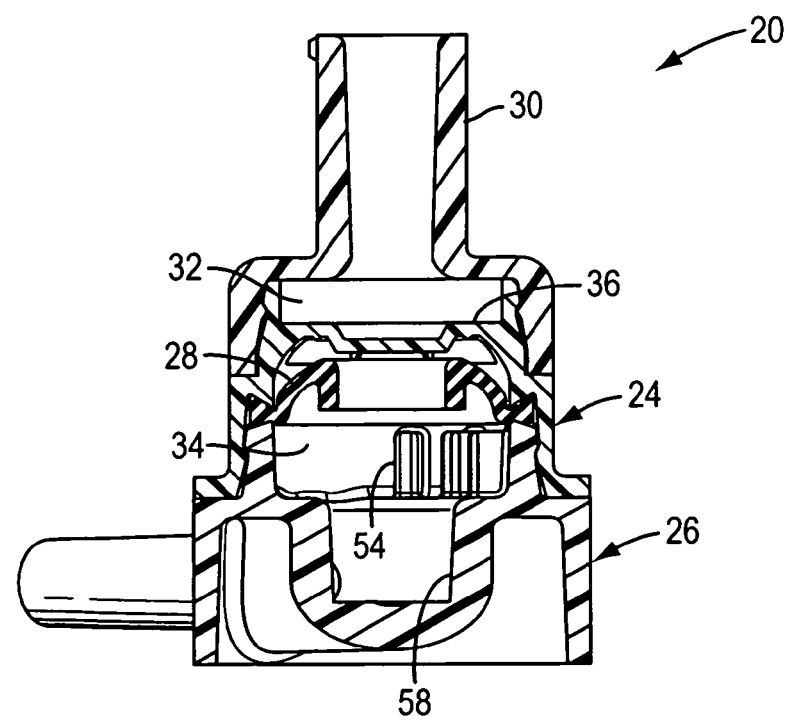
FIG. 8 is a cross-sectional view taken generally along lines 8-8 of FIG. 7.
Figure 9:
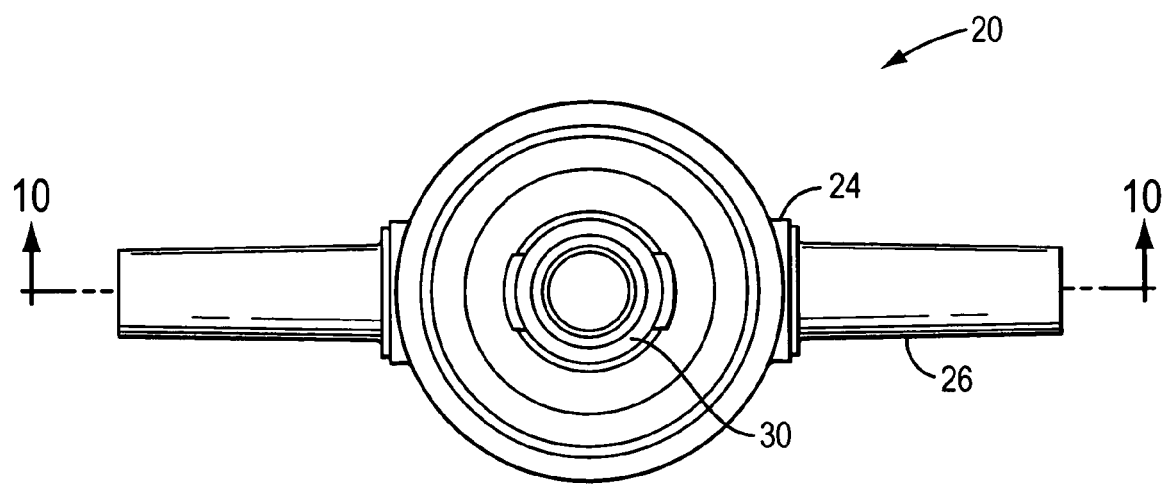
FIG. 9 is a further top plan view of the valve assembly of the present embodiment.
Figure 10:
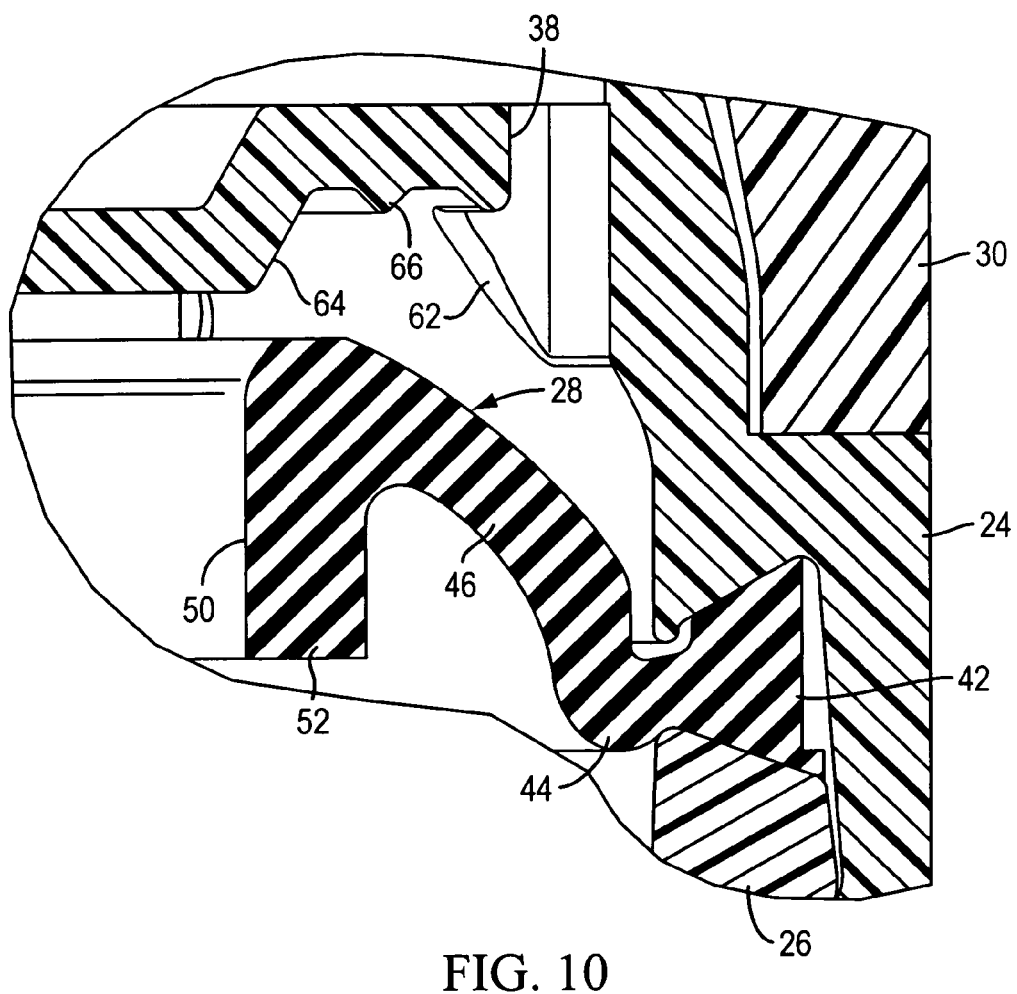
FIG. 10 is a relatively enlarged, fragmentary cross-sectional view taken along lines 10-10 of FIG. 9.
Figure 11:
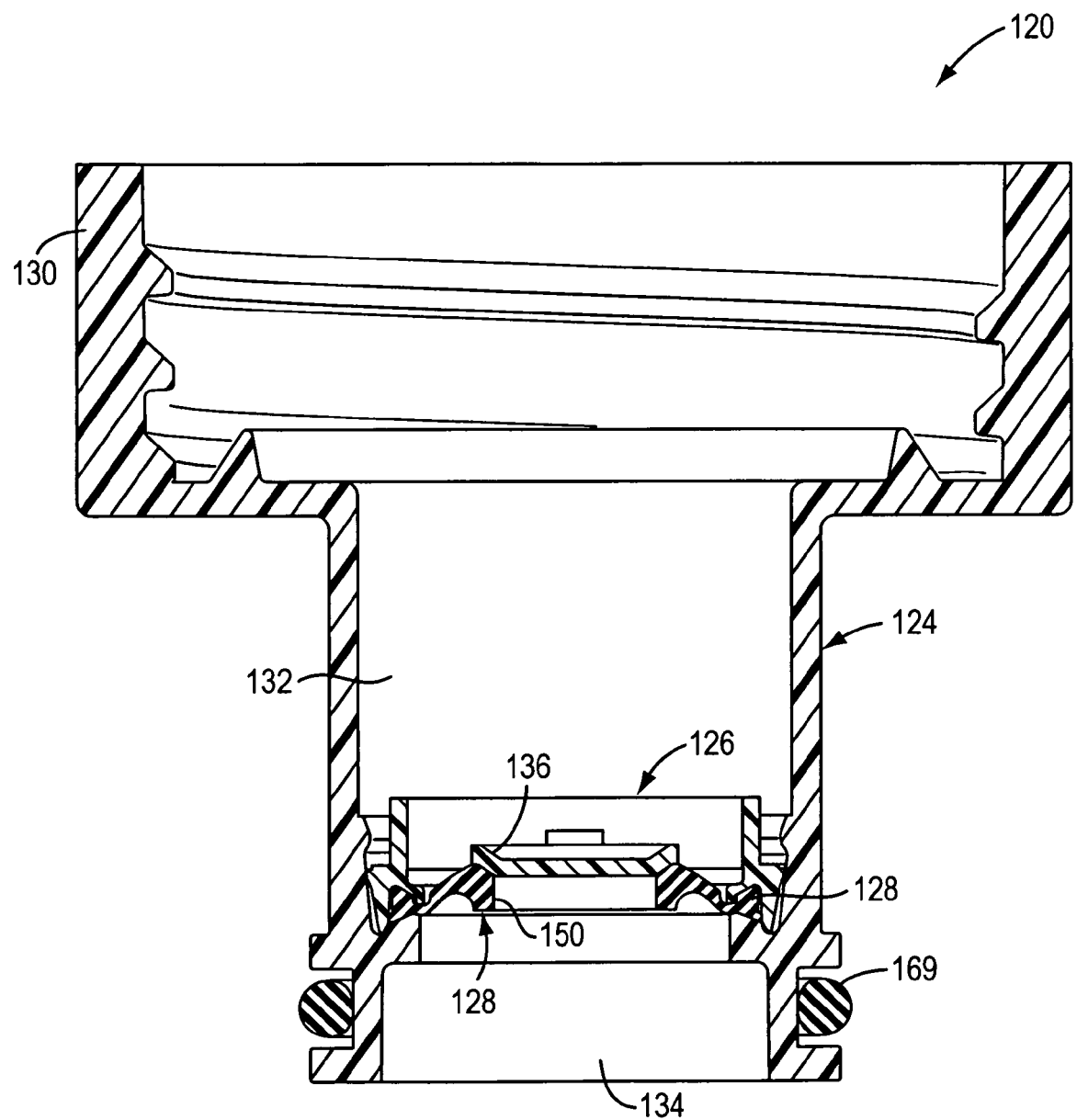
FIG. 11 is a cross-sectional view of a further embodiment of the present valve assembly, shown in a closed condition.

While this invention is susceptible of embodiment in many different forms, this specification and the accompanying drawings disclose specific forms as examples of the invention. The invention is not intended to be limited to the embodiments so described, however. The scope of the invention is pointed out in the appended claims.

For ease of description, many of the figures showing the valve assembly of the present invention illustrate the assembly in a typical orientation in which it may be used, with terms such as upper, lower, horizontal, etc., used with reference to the illustrated positions. It will be understood, however, that the valve assembly of the present invention may be manufactured, stored, transported, and sold in an orientation other than the orientation described.

The valve assembly of the present invention is suitable for use with a variety of conventional and special fluid flow systems, including containers, tanks, vessels, and other equipment or apparatus, the details of which, although not fully illustrated or described, would be apparent to those having skill in the art in an understanding of such fluid handling systems. It will be understood by those of ordinary skill in the art that novel and non-obvious inventive aspects are embodied in the described valve assembly alone.

With reference to FIGS. 1-10, therein is illustrated a first embodiment of the present valve assembly, designated 20. This embodiment of the present valve assembly is configured as a so-called T-fitting, which is typically employed for pressure responsive introduction of a liquid into another liquid stream, via the T-fitting. This specifically illustrated embodiment can be advantageously employed in medical applications, such as infusion systems.

In this embodiment, the valve assembly 20 includes a valve body which comprises a valve housing 24, and a valve retention member 26 joined by snap-fitment to the housing, with a flexibly resilient, elastomeric valve member 28 positioned within the valve body generally between the valve housing and the valve retention member, as will be further described. For a specific application in an infusion system, the illustrated embodiment of the present valve assembly includes a luer fitting 30, which can be threadably joined to the valve housing 24 to facilitate attachment of tubing or other components to the valve assembly.

As will be further described, the present valve assembly has been particularly configured to function as a check valve to provide pressure-responsive flow through the assembly, while at the same time minimizing and substantially preventing reverse fluid flow. To this end, the valve member 28 of the valve assembly cooperates with a valve seat defined by the valve housing 24 of the valve body, which valve seat preferably includes a compound sealing surface, including first and second sealing surfaces, with a further preferred provision of at least one retention projection on one of the valve body and the valve member. These features of the present invention will now be described in connection with this first embodiment of the present valve assembly.

As illustrated, the valve housing 24 of the valve body has a generally tubular configuration, and defines a first internal flow passage 32, which is joined in fluid communication with a second internal fluid flow passage 34 further defined by the valve housing of the valve body. The first and second internal flow passages of the valve housing are generally separated from each other by an internal valve seat 36 of the valve body, which in this embodiment is provided by the valve housing 24.

Fluid flow communication between the first and second internal flow passages of the valve housing is provided by at least one flow port 38 defined by the valve seat 36. In the illustrated embodiment, the valve seat 36 of the valve housing defines a plurality of circumferentially spaced ones of the flow ports 38, which in this embodiment are circumferentially spaced about an axis defined by the first and second internal flow passages. By the provision of the flow ports 38, fluid flow communication is provided between the first and second internal flow passages across the valve seat 36.

As noted, the elastomeric valve member 28 cooperates with the valve seat 36 to control fluid flow through the valve assembly in response to a pressure differential created across the valve assembly. To this end, the valve member has a generally annular configuration, and includes an annular, peripheral attachment portion 42 by which the valve member 28 is attached to the valve body of the valve assembly 20. The valve member further includes a flexible, resilient, intermediate portion 44 extending from the peripheral attachment portion 42.

The valve member 28 includes a valve head 46, defining a central flow orifice 50, with the valve head extending from the intermediate portion 44 for sealing engagement with the valve seat 36 of the valve assembly. Pressure-responsive flow through the valve assembly from the first internal flow passage 32 to the second internal flow passage 34 is effected by at least a part of the valve head 46 being outwardly deflectable to an open configuration of the valve member when a sufficient pressure differential exists across the valve assembly, to thereby permit flow from the first internal flow passage, through flow port 38, and the central flow orifice 50 of the valve head to the second internal flow passage 34.

In the illustrated embodiment, the valve head 46 of the valve member 28 includes a central sleeve portion 52 which defines the central flow orifice, with the sleeve portion extending generally away from the valve seat 36.

In this embodiment of the present invention, outward deflection of the valve head 46 of the valve member 28 is limited by the provision of at least one stop member on the valve body of the valve assembly. In the illustrated embodiment, a plurality of stop members 54 are provided on valve retention member 26, with the stop members 54 spaced circumferentially about an axis defined by the second internal flow passage 34 of the valve body.

In this embodiment, the present valve assembly is configured as a so-called T-fitting, and to this end, the valve retention member 26 defines a flow conduit 56 joined in fluid communication with the second internal flow passage 34 via a conduit opening 58 defined by the valve retention member 26. In accordance with this embodiment, at least one stop member is positioned on each side of the conduit opening 58, with three such stop members positioned on each side of the conduit opening in the illustrated embodiment.

While the illustrated embodiment shows the flow conduit 56 defined by the valve retention member 26 as being disposed at a right angle to the first and second internal flow passages, it will be appreciated that such a T-fitting can be otherwise configured, for example, with the flow conduit 56 arranged at an acute angle to the internal flow passages of the valve assembly, or in other configurations while keeping with the principals of the present invention.

In accordance with the present invention, enhanced sealing engagement between the valve member 28 and the valve seat 36 of the valve housing 24 is provided by configuring the valve seat to define a compound sealing surface, in particular, including a first sealing surface 62, and a second sealing surface 64, positioned inwardly of the first sealing surface 62. As will be observed, the first sealing surface 62, through which flow ports 38 extend, has a generally arcuate cross-sectional configuration. In contrast, the second sealing surface 64 has a frusto-conical configuration, having a generally linear cross-sectional configuration. It is believed that this preferred configuration of the valve seat enhances resistance to reverse fluid flow through the valve assembly.

Enhanced sealing between the valve member 28 and the valve housing is preferably further effected by the provision of at least one retention projection, on one of the valve body and the valve member, positioned generally intermediate the first and second sealing surfaces 62, 64, with the retention projection being engageable with the other of the valve body and the valve member. In the illustrated embodiment, an annular retention projection 66 is provided on the valve housing 24 of the valve body, intermediate first and second sealing surfaces 62, 64, with the projection 66 being engageable with valve member 24 generally at valve head 46.

Pressure-responsive operation of the valve assembly 20 will be readily appreciated from the above description. When a sufficient pressure differential exists across the valve housing 24 from first internal flow passage 32 to second internal flow passage 34, pressure acting through flow port 38 against the valve member acts to deflect the valve head 46 of the valve member out of sealing engagement with the valve seat, thus permitting fluid flow from the first internal flow passage, through the valve port, through central flow of orifice 50 of the valve member, and into the second internal flow passage. Outward deflection of the valve member is limited by the stop members 54 of the valve retention member, with this embodiment providing fluid flow from within the valve housing into the flow conduit 56 of the valve retention member.

The valve head 46 of valve member 28 moves back into its closed configuration, in sealing engagement with the valve seat 36, when there is an insufficient pressure differential between the first internal flow passage 32 and the second internal flow passage 34 to resist the resilience of the valve member. In its closed configuration, valve head 46 principally engages first sealing surface 62, and can further engage second sealing surface 64 of the valve seat, with the retention projection 66 engaging and penetrating the valve head 46. This cooperation between the valve head and the valve seat desirably acts to prevent reverse fluid flow through the valve assembly, with these preferred features of the present invention desirably enhancing resistance to reverse fluid flow.

Thus, this embodiment of the present invention provides a highly effective and economical check valve arrangement which can be advantageously employed such as for medical applications.

With reference now to FIGS. 11-14, therein is illustrated an alternate embodiment of the valve assembly of the present invention, in which elements which generally correspond to the previous embodiment are designed by like reference numerals in the 100-series.

This embodiment of the valve assembly, designated 120, is like the previous embodiment in that it provides a pressure-responsive flow control arrangement, which permits fluid flow through the valve assembly when a predetermined pressure differential exists across the assembly, with the valve assembly substantially preventing reverse fluid flow therethrough.

The valve assembly 120 includes a valve body including a valve housing 124 having a generally tubular configuration, and an associated valve retention member 126, joined by snap-fitment to the housing, and which cooperates with valve housing 124 to hold a flexible, resiliently deformable valve member 128 in captive relationship between the valve housing and the retention member. In this embodiment, the valve housing 124 of the valve body includes an internal thread formation at a threaded portion 130 of the housing, which can be configured for removable, threaded fitment to an associated container or like structure, thus facilitating dispensing of fluid from within the container through the valve assembly.

The valve assembly 120 defines a first internal flow passage 132, provided upstream of valve member 128, and a second internal flow passage 134 disposed downstream of the valve member. The valve housing 124 of the valve body defines a valve seat 136, with the housing defining at least one flow port 138 which provides fluid flow communication between the first and second internal flow passages 132, 134.

In distinction from the previous embodiment, valve assembly 120 of the present invention includes a valve seat 136 which is defined by retention member 126 of the valve body. The retention member 126 of the valve body defines at least one flow port 138 which extends between the first and second internal flow passages 132, 134 for joining the flow passages in fluid communication with each other.

The flexible, resiliently deformable valve member 128 of the valve assembly 120 includes an annular, peripheral attachment portion 142 having a dovetail cross-sectional configuration by which the valve member is held in captive relationship between the valve housing 124 and the valve retention member 126. The valve member 128 further includes a flexible, resilient, intermediate portion 144 extending from the peripheral attachment portion 142, and a central valve head 146 defining a central flow orifice 150. The valve member 128 further includes a sleeve portion 152 which defines the central flow orifice 150 through which fluid flows from the first internal passageway 132, through the one or more valve portions 138, and into the second internal fluid flow passage 134.

Figure 12:
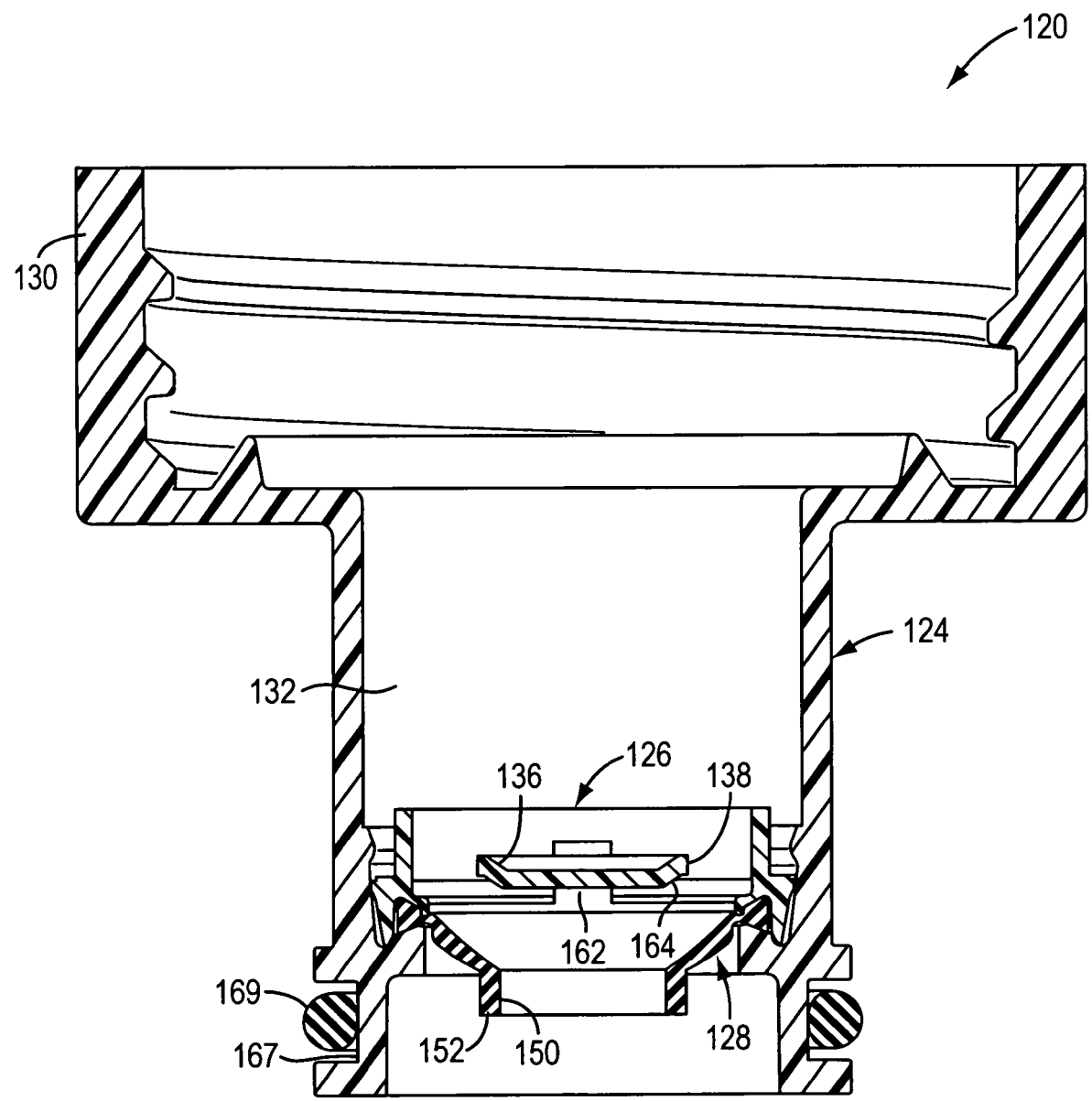
FIG. 12 is a cross-sectional view, similar to FIG. 11, showing this further embodiment of the present valve assembly in an open condition.
Figure 15:
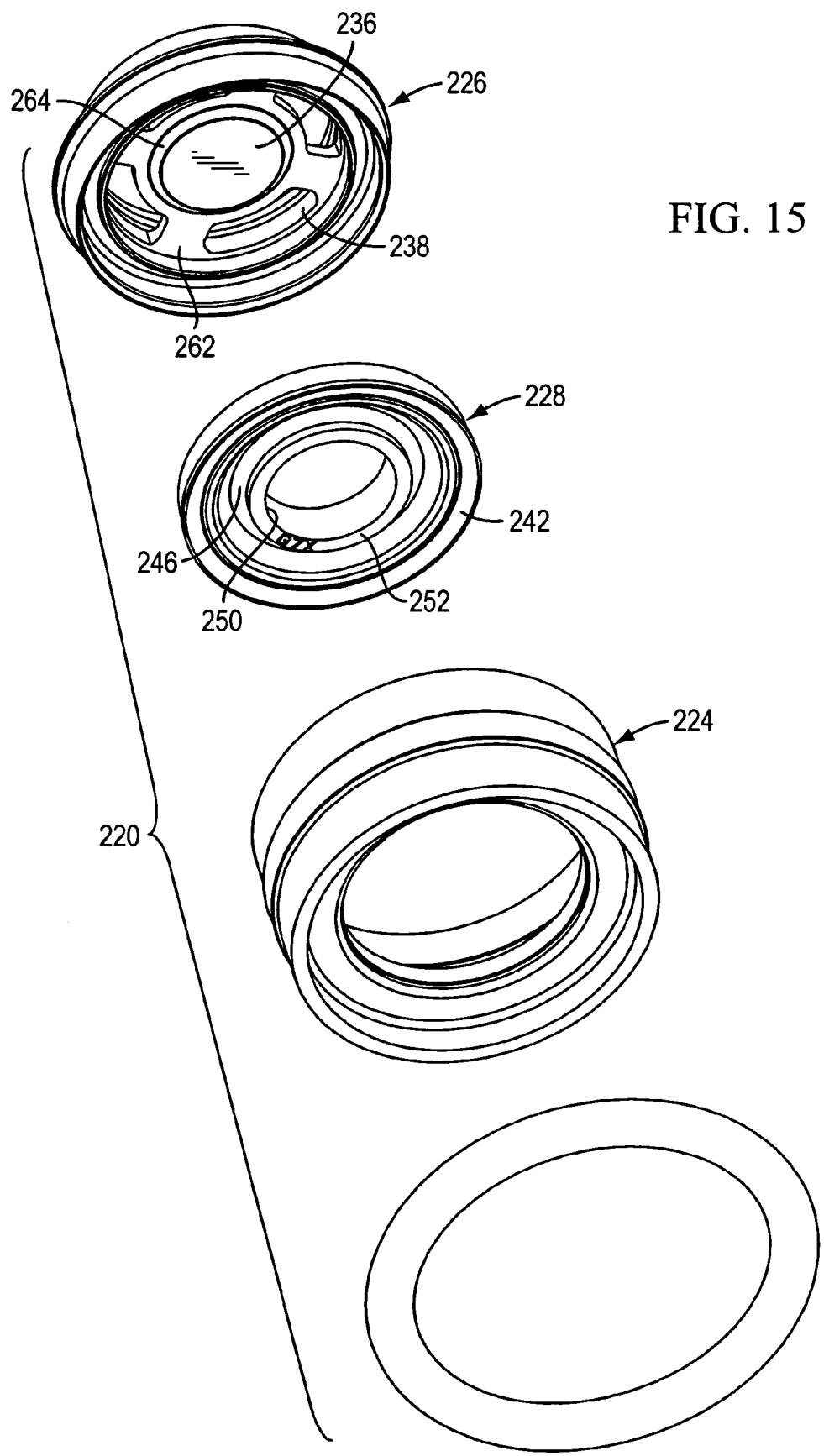
FIG. 15 is an exploded, isometric view of a further embodiment of the present valve assembly.
Figure 16:
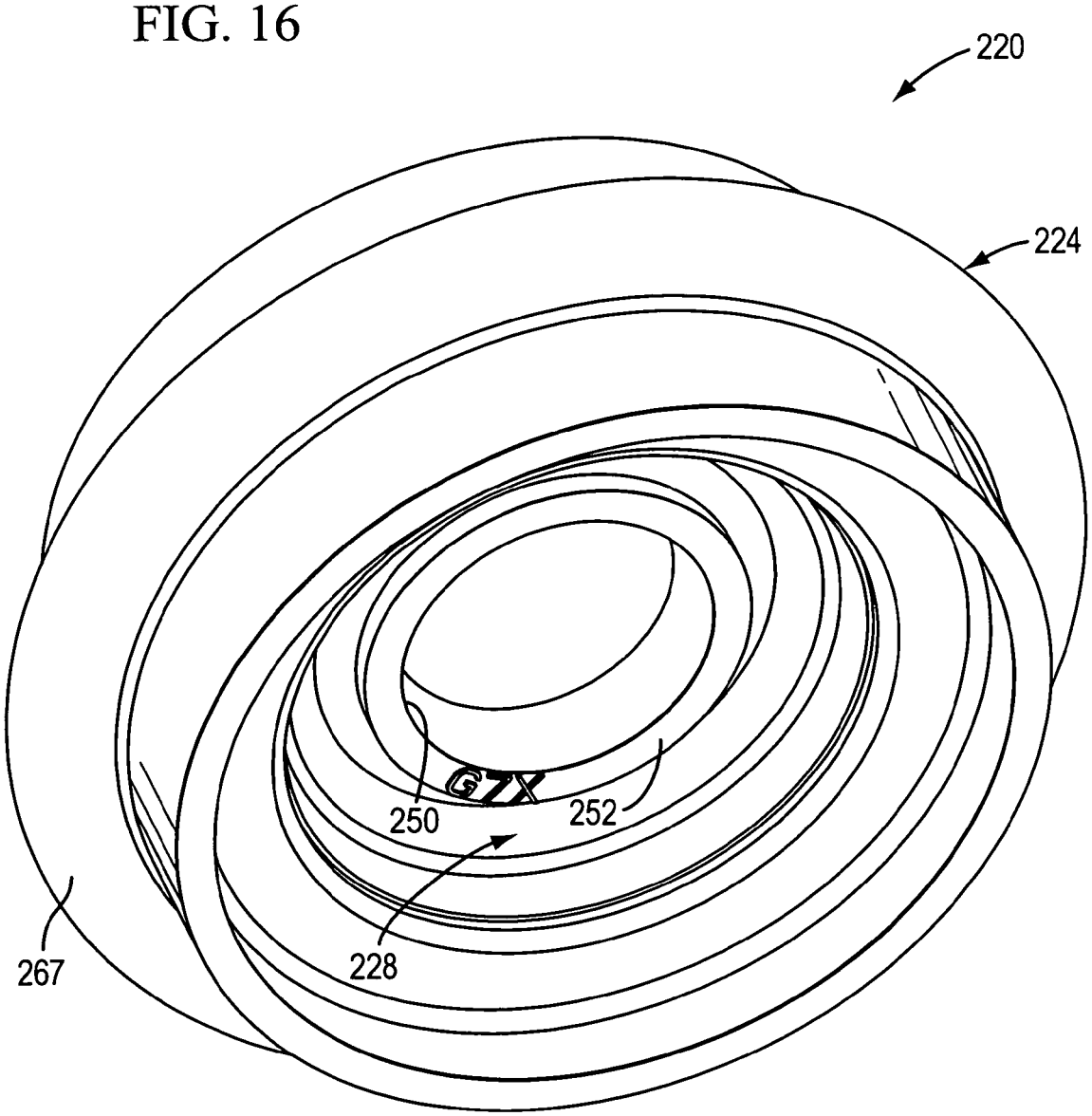
FIG. 16 is an isometric view of the assembled valve assembly of this embodiment.
Figure 17:
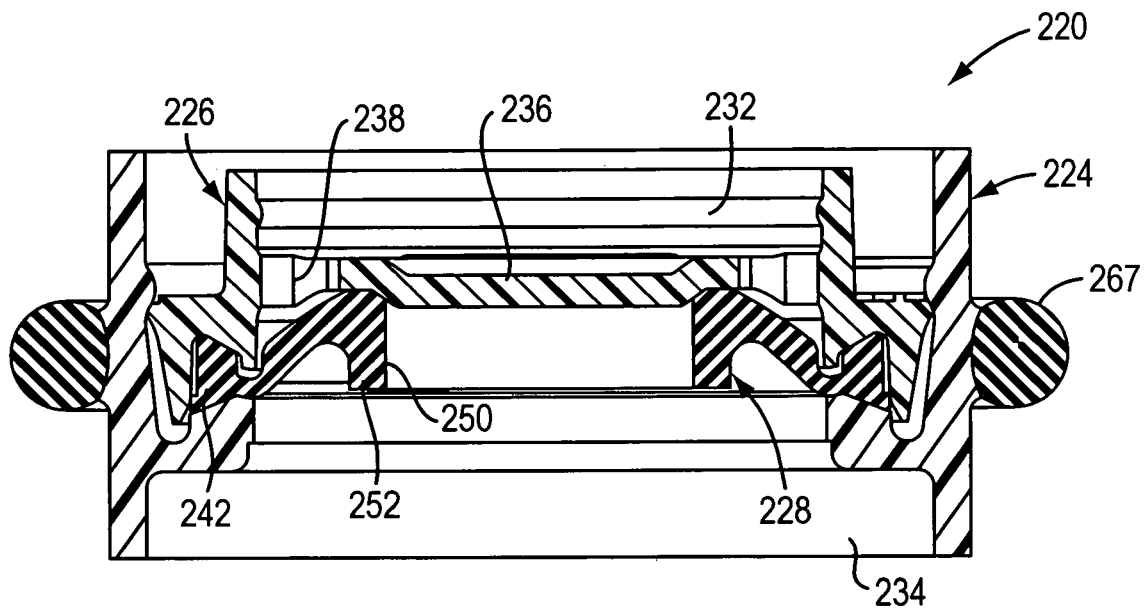
FIG. 17 is a cross-sectional view of the valve assembly of this embodiment shown in a closed configuration.
Figure 18:
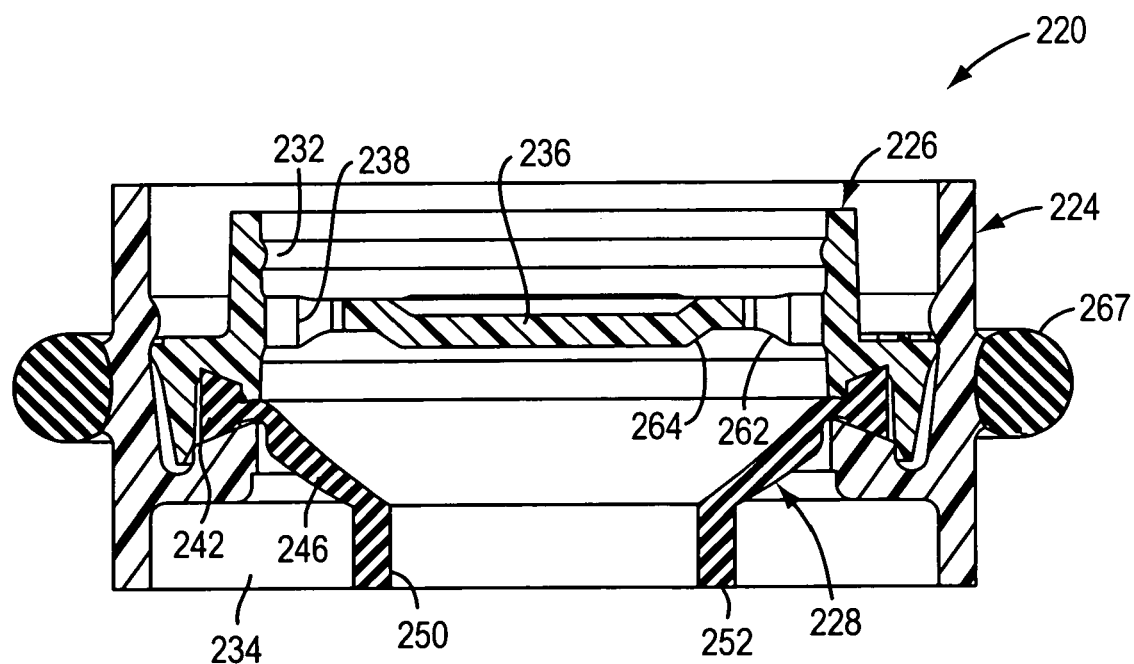
FIG. 18 is a cross-sectional view, similar to FIG. 17, showing the valve assembly of this embodiment in an open condition.

As in the previous embodiment, this embodiment of the present valve assembly includes a valve seat which defines a compound sealing surface, including a first outer sealing surface 162, and an inner sealing surface 164. As in the previous embodiment, the first sealing surface 162 has a generally arcuate cross-sectional configuration, with the one or more flow ports 138 extending therethrough. In contrast, the second sealing surface 164 has a frusto-conical configuration, having a generally linear cross-sectional configuration. Again, enhanced resistance to reverse fluid flow is provided by the preferred compound configuration of the sealing surface at valve seat 136. Fluid flow is provided when a sufficient pressure differential exists across the valve assembly from first internal flow passage 132 to second internal flow passage 134, thereby deflecting the head of valve 128 from its closed configuration in sealing engagement with the valve seat 136 (FIG. 11), to its open configuration, wherein the valve head is deflected from the valve seat (FIG. 12).

In this embodiment, a portion of the valve housing 124, downstream of valve member 128, defines an annular groove 167 for retention of an associated elastomeric O-ring seal 169 to permit sealed engagement of the valve housing generally within an associated tubular structure, as may be desired for certain applications.

With reference now to FIGS. 15-18, therein is illustrated a further alternate embodiment of the valve assembly of the present invention, designated 220, with elements of this embodiment, which generally correspond to those of the previous embodiments designated by like reference numerals in the 200-series.

Valve assembly 220 is provided generally in the form of a check valve assembly for fitment with associated tubing, conduits, containers, or the like for providing pressure-responsive flow control as may be required for any specific applications. As in the previous embodiments, flow through the valve assembly is provided when a sufficient pressure differential is created across the assembly.

In this embodiment, the valve assembly includes a valve body having a valve housing 224 having a generally tubular configuration, and an associated valve retention member 226 which cooperates, by snap-fitment, with the valve housing 224 to retain a generally annular, flexible, resiliently deformable valve member 228 in captive relationship therebetween.

The valve body of valve assembly 220 defines a first internal flow passage 232, and a second internal flow passage 234 which are respectively provided upstream and downstream of a valve seat 236 defined by the valve body, which in this embodiment is provided by valve retention member 226. One or more flow ports 238 extend between the first and second internal flow passages, joining the flow passages in fluid flow communication with each other.

A flexible, resiliently deformable valve member 228 has a generally annular configuration, including an annular peripheral attachment portion 242 having a dovetail cross-sectional configuration for retention between valve housing 224 and valve retention member 226. The valve member further includes a flexible, resilient, intermediate portion 244 extending from peripheral portion 242, and a central valve head 246 which defines a central flow orifice 250. In the illustrated embodiment, the valve head 246 of the valve member includes a sleeve portion 252 which defines the central flow orifice 250, and extends generally away from the valve seat.

In accordance with the present invention, the valve seat 236 of the valve assembly 220 has a compound sealing surface, including a first, outer sealing surface 262, and a second, inner sealing surface 264. As in the previous embodiments, first sealing surface 262, through which flow ports 238 extend, has a generally arcuate, cross-sectional configuration. In contrast, second sealing surface 264 has a frusto-conical configuration, with a generally linear cross-sectional configuration. Enhanced resistance to reverse fluid flow is provided.

In the illustrated embodiment, the valve assembly includes an elastomeric sealing O-ring 267 fitted about the exterior of valve housing 224 for sealed fitment of the valve assembly within an associated tubular structure or like arrangement.

Pressure-responsive fluid flow control is provided by deflection of the central valve head 246 away from the associated valve seat from a closed configuration (FIG. 17) to an open configuration (FIG. 18) when a sufficient pressure differential exists across the valve assembly to thus permit flow from the first internal flow passage 232, through flow ports 238 and central orifice 250, to second internal flow passage 234.

It will be readily observed from the foregoing detailed description of the invention and from the illustrations thereof that numerous other variations and modifications can be effected without departing from the true spirit and scope of the novel concepts or principals of this invention.

What is claimed is:

1. A valve assembly for controlling flow of a fluid within the assembly, said dispensing valve assembly comprising:
    a valve body defining first and second internal flow passages, said valve body including an internal valve seat positioned between said first and second internal flow passages, said valve seat defining at least one flow port extending between said first and second flow passages for joining said flow passages in fluid communication with each other; and
    a flow-controlling valve member positioned within said valve body generally adjacent to said valve seat for controlling flow between said first and second flow passages through said flow port,
    said valve member including a peripheral attachment portion by which said valve member can be attached to said valve body, a flexible, resilient, intermediate portion extending from said peripheral attachment portion, and a central valve head, defining a central flow orifice, extending from said intermediate portion for sealing engagement with said valve seat of said valve body, at least part of said valve head being outwardly deflectable to an open configuration of said valve member when a sufficient pressure differential exists across said valve assembly to permit flow from said first internal flow passage through said flow port and said central flow orifice to said second internal flow passage,
    said valve seat defining a compound sealing surface for cooperative sealing engagement with the valve head of said valve member, said compound sealing surface including a first sealing surface having a generally arcuate cross-sectional configuration through which said at least one flow port extends, and a second, frusto-conical sealing surface, positioned inwardly of said first sealing surface, having a generally linear cross-sectional configuration, said valve head being sealingly engagable with said first and second sealing surfaces in a closed configuration of said valve member for preventing flow from said second internal flow passage through said flow port to said first internal flow passage, wherein one of said valve body and said valve member defines at least one retention projection, positioned generally intermediate said first and second sealing surfaces, and engageable with the other of said valve body and said valve member.

2. The valve assembly in accordance with claim 1, wherein said valve body defines at least one stop member for limiting deflection of the valve head of said valve member in the open configuration thereof.

3. The valve assembly in accordance with claim 2, wherein said valve body defines a plurality of said stop members spaced circumferentially about an axis defined by said second internal flow passage of said valve body.

4. The valve assembly in accordance with claim 1, wherein said valve head of said valve member includes a central sleeve portion that defines said central flow orifice, said sleeve portion extending generally away from said second sealing surface of said valve seat.

5. A valve assembly in accordance with claim 1, wherein said peripheral attachment portion of said valve member has a dove-tail cross-sectional configuration.

6. A valve assembly in accordance with claim 1, wherein said valve body includes a valve housing which defines said valve seat, and a valve retention member having an annular valve retention portion, said valve member being positioned in captive relationship between said valve housing and said annular retention portion of said valve retention member.

7. A valve assembly in accordance with claim 6, wherein said valve retention member defines a flow conduit joined in fluid communication with said second internal flow passage via a conduit opening defined by said valve retention member.

8. A valve assembly in accordance with claim 7, wherein said valve retention member includes at least one stop member positioned on each side of said conduit opening for limiting deflection of the valve head of said valve member in the open configuration thereof.

9. A valve assembly in accordance with claim 7, wherein said flow conduit defined by said valve retention member is disposed at a right angle to said first and second internal flow passages.

10. A valve assembly in accordance with claim 1, wherein said valve body includes an internal thread formation at said first internal flow passage.

11. A valve assembly for controlling flow of a fluid within the assembly, said dispensing valve assembly comprising:
    a valve body defining first and second internal flow passages, said valve body including an internal valve seat positioned between said first and second internal flow passages, said valve seat defining at least one flow port extending between said first and second flow passages for joining said flow passages in fluid communication with each other; and
    a flow-controlling valve member positioned within said valve body generally adjacent to said valve seat for controlling flow between said first and second flow passages through said flow port,
    said valve member including a peripheral attachment portion by which said valve member can be attached to said valve body, a flexible, resilient, intermediate portion extending from said peripheral attachment portion, and a central valve head, defining a central flow orifice, extending from said intermediate portion for sealing engagement with said valve seat of said valve body, at least part of said valve head being outwardly deflectable to an open configuration of said valve member when a sufficient pressure differential exists across said valve assembly to permit flow from said first internal flow passage through said flow port and said central flow orifice to said second internal flow passage,
    said valve seat defining a compound sealing surface for cooperative sealing engagement with the valve head of said valve member, said compound sealing surface including a first sealing surface having a generally arcuate cross-sectional configuration through which said at least one flow port extends, and a second, frusto-conical sealing surface, positioned inwardly of said first sealing surface, having a generally linear cross-sectional configuration, said valve head being sealingly engagable with said first and second sealing surfaces in a closed configuration of said valve member for preventing flow from said second internal flow passage through said flow port to said first internal flow passage, wherein said valve body defines at least one retention projection positioned generally intermediate said first and second sealing surfaces, said retention projection being engagable with said valve head of said valve member when said valve head sealingly engages said first and second sealing surfaces.

12. A valve assembly in accordance with claim 11, wherein said retention projection has an annular configuration.

13. A valve assembly in accordance with claim 12, wherein said retention projection is continuous.

14. A valve assembly for controlling flow of a substance within the assembly, said valve assembly comprising:
   a valve body defining first and second internal flow passages, said valve body including an internal valve seat positioned between said first and second internal flow passages, said valve seat defining at least one flow port extending between said first and second flow passages for joining said flow passages in fluid communication with each other; and
   a flow-controlling valve member positioned within said valve body generally adjacent to said valve seat for controlling flow between said first and second flow passages through said flow port,
   said valve member including a peripheral attachment portion by which said valve member can be attached to a dispensing valve body, a flexible, resilient, intermediate portion extending from said peripheral attachment portion, and a central valve head, defining a central flow orifice, extending from said intermediate portion for sealing engagement with said valve seat of said dispensing valve body, at least part of said valve head being outwardly deflectable to an open configuration of said valve member when a sufficient pressure differential exists across said valve assembly to permit flow from said first internal flow passage through said flow port and said central flow orifice to said second internal flow passage,
   said valve seat defining a compound sealing surface for cooperative sealing engagement with the valve head of said valve member, said compound sealing surface including a first sealing surface through which said at least one flow port extends, and a second sealing surface, positioned inwardly of said first sealing surface, said valve head being sealingly engagable with said first and second sealing surfaces in a closed configuration of said valve member for preventing flow from said second internal flow passage through said flow port to said first internal flow passage,
   said valve seat of said valve body further defining at least one annular retention projection, positioned generally intermediate said first and second sealing surfaces, and engageable with said valve member,
   said valve body including a valve housing which includes said valve seat, and a valve retention member having an annular valve retention portion, said valve member being positioned generally within said second internal flow passage in captive relationship between said valve housing and said annular retention portion of said valve retention member,
   said valve retention member defining a flow conduit joined in fluid communication with said second internal flow passage via a conduit opening defined by said valve retention member, wherein said valve retention member includes at least one stop member positioned on each side of said conduit opening for limiting deflection of the valve head of said valve member in the open configuration thereof.

15. A valve assembly in accordance with claim 14, wherein said valve housing includes an external thread formation at an end thereof generally opposite said retention member, said valve assembly including a luer fitting for threaded engagement with said external thread formation.

16. A valve assembly in accordance with claim 14, wherein said first sealing surface has a generally arcuate cross-sectional configuration.

17. A valve assembly in accordance with claim 14, wherein said second sealing surface has a frusto-conical configuration.

* * * * *